(12) United States Patent  
Higashi

(10) Patent No.: US 9,592,836 B2  
(45) Date of Patent: Mar. 14, 2017

(54) TRAVELLING VEHICLE SYSTEM

(71) Applicant: Murata Machinery, Ltd., Kyoto-shi, Kyoto (JP)

(72) Inventor: Toshimitsu Higashi, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 18 days.

(21) Appl. No.: 14/837,801

(22) Filed: Aug. 27, 2015

(65) Prior Publication Data

US 2016/0060035 A1     Mar. 3, 2016

(30) Foreign Application Priority Data

Sep. 2, 2014   (JP) ................................ 2014-178482

(51) Int. Cl.
| | | |
|---|---|---|
| *G05D 1/00* | (2006.01) | |
| *B61B 13/02* | (2006.01) | |
| *B61L 15/00* | (2006.01) | |
| *B61L 19/06* | (2006.01) | |
| *B61L 23/34* | (2006.01) | |
| *B61L 27/00* | (2006.01) | |
| *G06Q 10/08* | (2012.01) | |

(52) U.S. Cl.
CPC .......... *B61B 13/02* (2013.01); *B61L 15/0027* (2013.01); *B61L 19/06* (2013.01); *B61L 23/34* (2013.01); *B61L 27/0038* (2013.01); *G06Q 10/08* (2013.01)

(58) Field of Classification Search
USPC .......................................................... 701/19
See application file for complete search history.

(56) References Cited

U.S. PATENT DOCUMENTS

| | | | | |
|---|---|---|---|---|
| 5,547,151 A | * | 8/1996 | Giras ........................ | B61L 5/06 246/227 |
| 5,806,809 A | * | 9/1998 | Danner ................... | B61L 5/107 246/220 |
| 6,296,208 B1 | * | 10/2001 | Franke .................... | B61L 5/107 246/220 |

(Continued)

FOREIGN PATENT DOCUMENTS

| | | |
|---|---|---|
| JP | 07-006029 U | 1/1995 |
| JP | 08-099792 A | 4/1996 |
| JP | 2004-142491 A | 5/2004 |

*Primary Examiner* — Muhammad Shafi
(74) *Attorney, Agent, or Firm* — DLA Piper LLP (US)

(57) ABSTRACT

A travelling vehicle system that allows a travelling vehicle to smoothly pass through a switching region where a state of a track is switched. The system includes a switching device which switches a state of a track in the switching region, and a host controller which manages a travelling vehicle. The switching device includes a detector which detects the state of the track in the switching region, and a report device which is arranged along the track from the switching region toward the upstream side of the track and reports switching information showing the state of the track. The host controller includes a permission issuing part which issues to the travelling vehicle controller a passage permission, and the travelling vehicle controller includes a travelling control part which determines whether or not to stop before the switching region based on the passage permission and the switching information.

6 Claims, 5 Drawing Sheets

(56) References Cited

U.S. PATENT DOCUMENTS

| | | | | |
|---|---|---|---|---|
| 6,691,958 | B2* | 2/2004 | Biagiotti | B61L 5/107 246/221 |
| 8,020,493 | B2* | 9/2011 | Blum | A63G 7/00 104/101 |
| 2005/0178929 | A1* | 8/2005 | Biagiotti | B61L 5/00 246/449 |
| 2008/0251649 | A1* | 10/2008 | Salmans | B61L 5/045 246/415 R |
| 2009/0065653 | A1* | 3/2009 | Vance | E01B 25/12 246/415 R |
| 2009/0072097 | A1* | 3/2009 | Arnold | B61L 5/107 246/220 |
| 2010/0163688 | A1* | 7/2010 | Blum | A63G 7/00 246/219 |

\* cited by examiner

TRAVELLING VEHICLE SYSTEM

CROSS-REFERENCE TO RELATED APPLICATIONS

This application claims the benefit of priority under 35 USC 119 of Japanese application no. 2014-178482, filed on Sep. 2, 2014.

BACKGROUND OF THE INVENTION

1. Field of the Invention

The present invention relates to a travelling vehicle system for carrying a cargo along a track to transfer the cargo to a rack or the like.

2. Description of the Related Art

There has hitherto been known a travelling vehicle system for allowing a travelling vehicle to travel along a rail hung on a ceiling to carry a cargo in the vicinity of the ceiling. The travelling vehicle is provided with a lift stage liftably hung by means of a hanging member. The travelling vehicle transfers the cargo by lowering the lift stage to a placement member of a rack arranged along a travelling route of the travelling vehicle.

The track is installed in accordance with arrangement of the rack. The track may be provided with a switching unit for switching a state of the track. For example, the switching unit switches a course at a divergence or a merge of the track (e.g., see Unexamined Japanese Patent Publication No. 07-6029). The travelling vehicle searches a travelling route in accordance with a cargo loading/unloading instruction and passes through a region provided with the switching unit (a switching region), to reach a target rack.

BRIEF SUMMARY OF THE INVENTION

However, in the conventional technique, in order to pass through the switching region, it has been necessary for the travelling vehicle to temporarily stop before the switching region and check the state of the track.

Accordingly, the present invention provides a travelling vehicle system that allows a travelling vehicle to smoothly pass through a switching region where a state of a track is switched.

A travelling vehicle system according to one aspect of the present invention includes: a track; a travelling vehicle which travels on the track and has a travelling vehicle controller for controlling driving of the travelling vehicle; a switching device which switches a state of the track in a switching region; and a host controller which can communicate with the travelling vehicle and the switching device and manages the travelling vehicle. The switching device includes a switching unit which is provided in the switching region and switches the state of the track, a detector which detects the state of the track in the switching region, a report device which is arranged along the track from the switching region toward the upstream side of the track and reports switching information showing the state of the track detected by the detector, and a switching controller which controls the switching unit based on an instruction from the host controller. The host controller includes a switching instruction part which instructs the switching controller to switch the state of the track based on a request from the travelling vehicle controller, and a permission issuing part which issues to the travelling vehicle controller a passage permission of the switching region. The travelling vehicle controller includes a travelling control part which determines whether or not the travelling vehicle stops before the switching region based on the passage permission from the host controller and the switching information from the report device.

With this configuration, the switching information showing the state of the track in the switching region is reported by the report device arranged along the track from the switching region toward the upstream side of the track. Hence the travelling vehicle can acquire the switching information while travelling, so as to determine whether or not the travelling vehicle stops before the switching region. That is, the travelling vehicle can pass through the switching region without stopping before the switching region, so as to smoothly pass through the switching region.

Further, with this configuration, it is possible to determine whether or not the travelling vehicle stops before the switching region based on the passage permission from the host controller and the switching information from the report device. Hence it is possible to suppress erroneous passage through the switching region, so as to reduce an accident of the travelling vehicle in the switching region and improve the safety of the travelling vehicle system.

For example, the switching unit may selectively switch a course at a divergence or a merge of the track, and the travelling vehicle controller may determine that the travelling vehicle does not stop before the switching region when (i) the passage permission is issued, and (ii) the state of the track conforms to a travelling route of the travelling vehicle at the divergence or the merge of the track.

With this configuration, when the switching unit is equipment for selectively switching a course at a divergence or a merge of the track, it is possible to appropriately determine whether or not the travelling vehicle stops before the switching region. Specifically, it is possible to determine that the travelling vehicle does not stop before the switching region when the passage permission is issued and the state of the track conforms to the travelling route of the travelling vehicle at the divergence or the merge of the track. Hence the travelling vehicle can smoothly travel along the travelling route at the divergence or the merge of the track without stopping before the switching region.

For example, the switching unit may slide two movable rails between a right end and a left end, to selectively switch the course, the detector may detect, as the state of the track, whether or not the two movable rails are at the right end and whether or not the two movable rails are at the left end, and the report device may report, as the switching information, information showing whether or not the two movable rails are at the right end and information showing whether or not the two movable rails are at the left end.

With this configuration, even when the switching unit is equipment for sliding the two movable rails between the right end and the left end to selectively switch the course, the travelling vehicle can smoothly pass through the switching region.

For example, the switching information may further include information showing whether or not the switching device is in automatic operation, and the travelling vehicle controller may determine that the travelling vehicle does not stop before the switching region when (i) the passage permission is issued, (ii) the state of the track conforms to the travelling route of the travelling vehicle at the divergence or the merge of the track, and (iii) the switching device is in automatic operation.

With this configuration, when the switching device is in automatic operation, it is possible to determine that the travelling vehicle does not stop before the switching region.

That is, when the switching device is in manual operation, it is possible to prevent the travelling vehicle from entering the switching region, so as to reduce an accident of the travelling vehicle in the switching region and improve the safety of the travelling vehicle system.

For example, the host controller may further include a list generation part which, when the travelling vehicle passes through the switching region, generates a list showing an alignment sequence of a plurality of travelling vehicles present on the route where the travelling vehicle travels, and transmits the list to the travelling vehicle.

With this configuration, when the travelling vehicle passes through the switching region, the list showing the alignment sequence of a plurality of travelling vehicles can be transmitted to the travelling vehicle. That is, even when the alignment sequence of a plurality of travelling vehicles on the route changes by the travelling vehicle passing through the switching region, a list showing the updated alignment sequence can be transmitted to the travelling vehicle. Hence the travelling vehicle can correctly grasp a forward travelling vehicle, so as to appropriately control a distance from the forward travelling vehicle.

For example, the switching unit may be an openable shutter for dividing a space in the switching region, the detector may detect, as the state of the track, whether or not the shutter is in an open state, the report device may report, as the switching information, information showing whether or not the shutter is in the open state, and the travelling vehicle controller may determine that the travelling vehicle does not stop before the switching region when (i) the passage permission is issued, and (ii) the shutter is in the open state.

With this configuration, even when the switching unit is the shutter, it is possible to pass through the switching region without stopping before the switching region, so as to smoothly pass through the switching region.

It is to be noted that comprehensive or specific aspects of these may be realized by a device, a method, an integrated circuit, a computer program or a computer-readable recording medium such as a CD-ROM, or may be realized by arbitrary combination of the device, the method, the integrated circuit, the computer program and the recording medium.

With a travelling vehicle system according to one aspect of the present invention, a travelling vehicle can smoothly pass through a switching region where a state of a track is switched.

DETAILED DESCRIPTION OF PREFERRED EMBODIMENTS

An embodiment will be specifically described with reference to the drawings.

It is to be noted that any embodiment described below shows a comprehensive or specific example. Numerical values, shapes, materials, constituents, arranged positions and a connection configuration of the constituents, steps, a sequence of the steps, and the like shown in the following embodiment are one example, and not intended to restrict the claims.

Embodiment

A travelling vehicle system according to an embodiment will be described by use of FIGS. 1 to 5.

[1. Configuration of Travelling Vehicle System]

Figure 1:
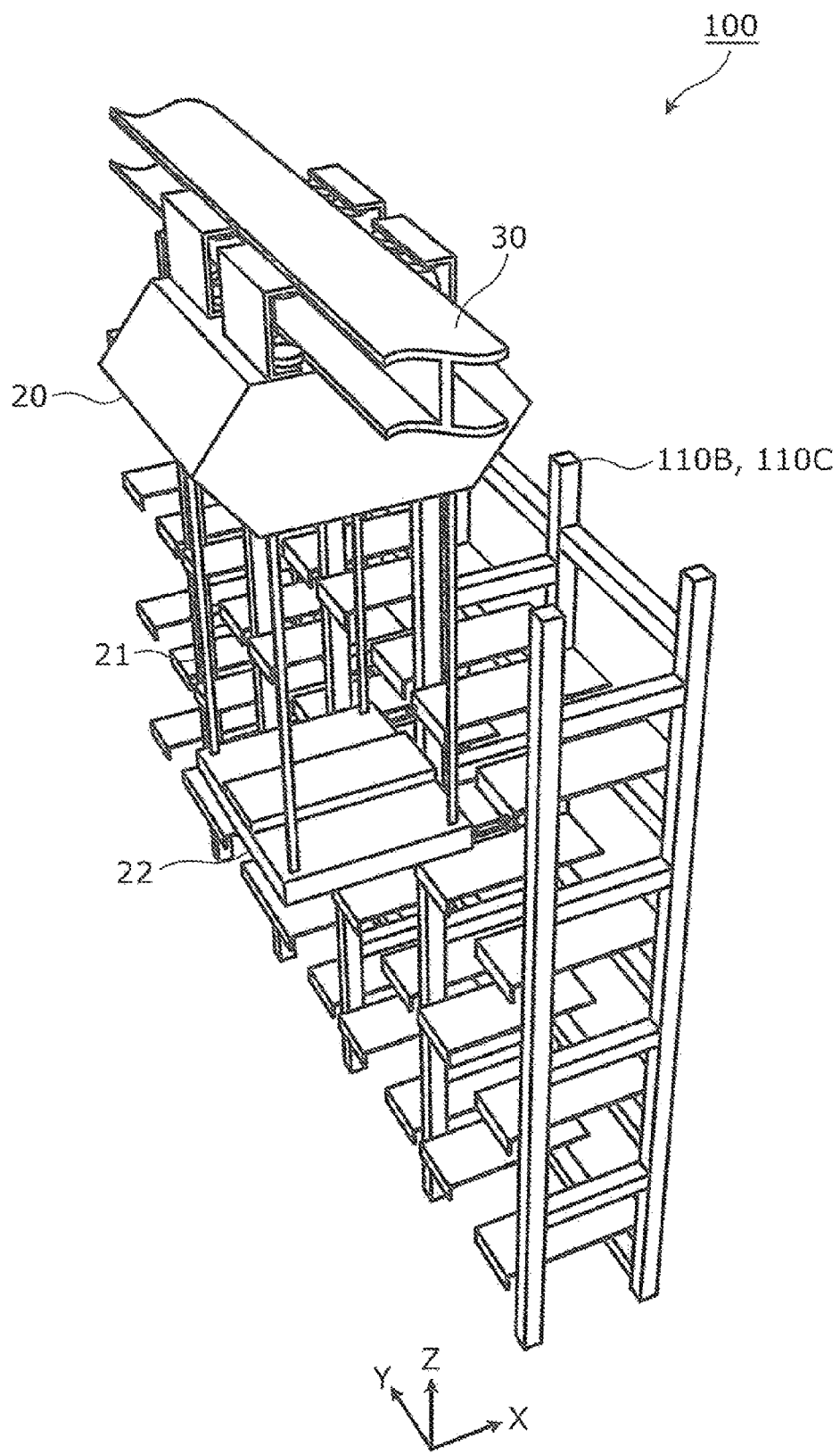
FIG. 1 is a perspective view illustrating a part of a travelling vehicle system according to an embodiment.
Figure 2:
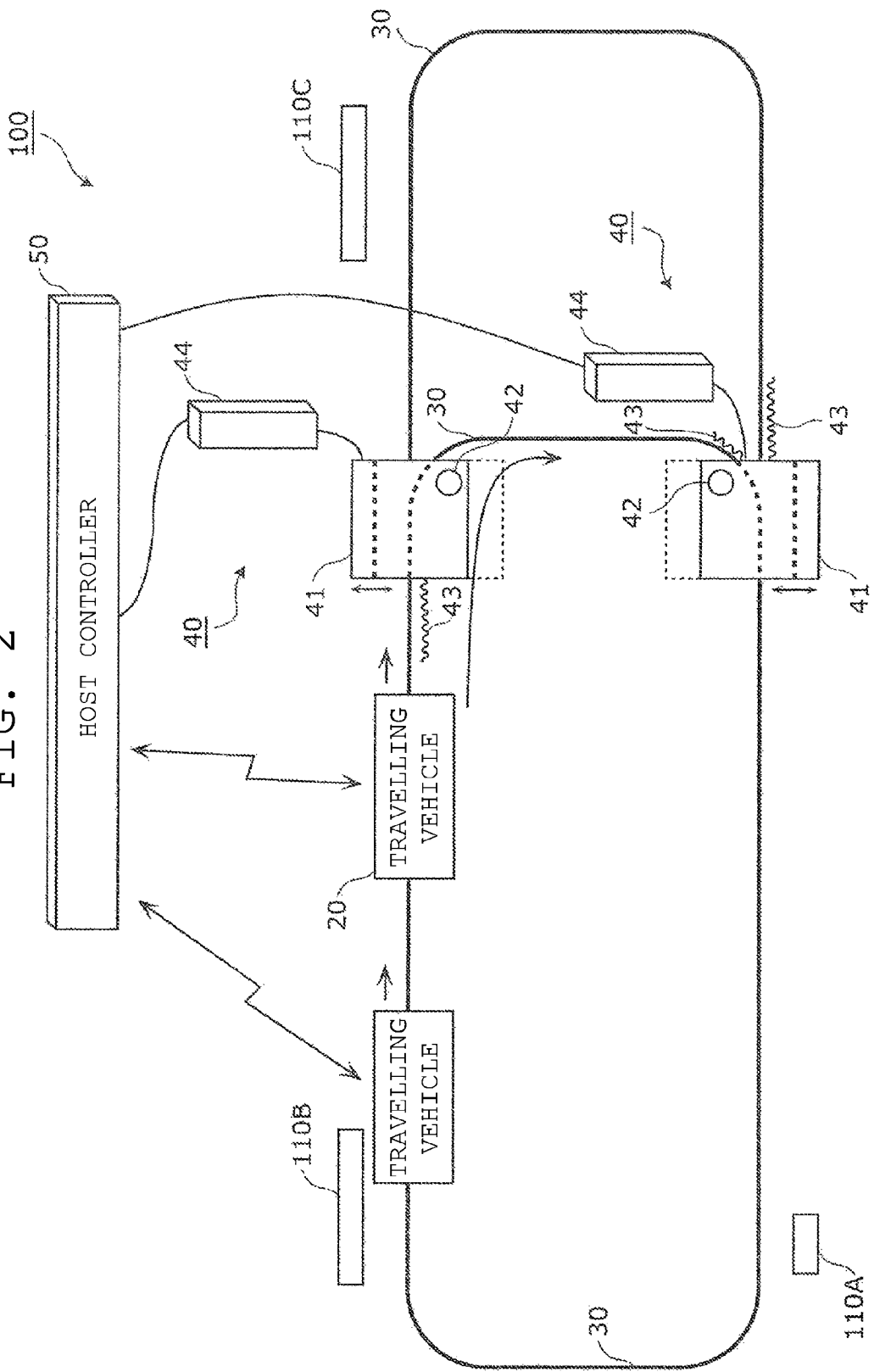
FIG. 2 is a view illustrating a configuration of the travelling vehicle system according to the embodiment.
Figure 3:
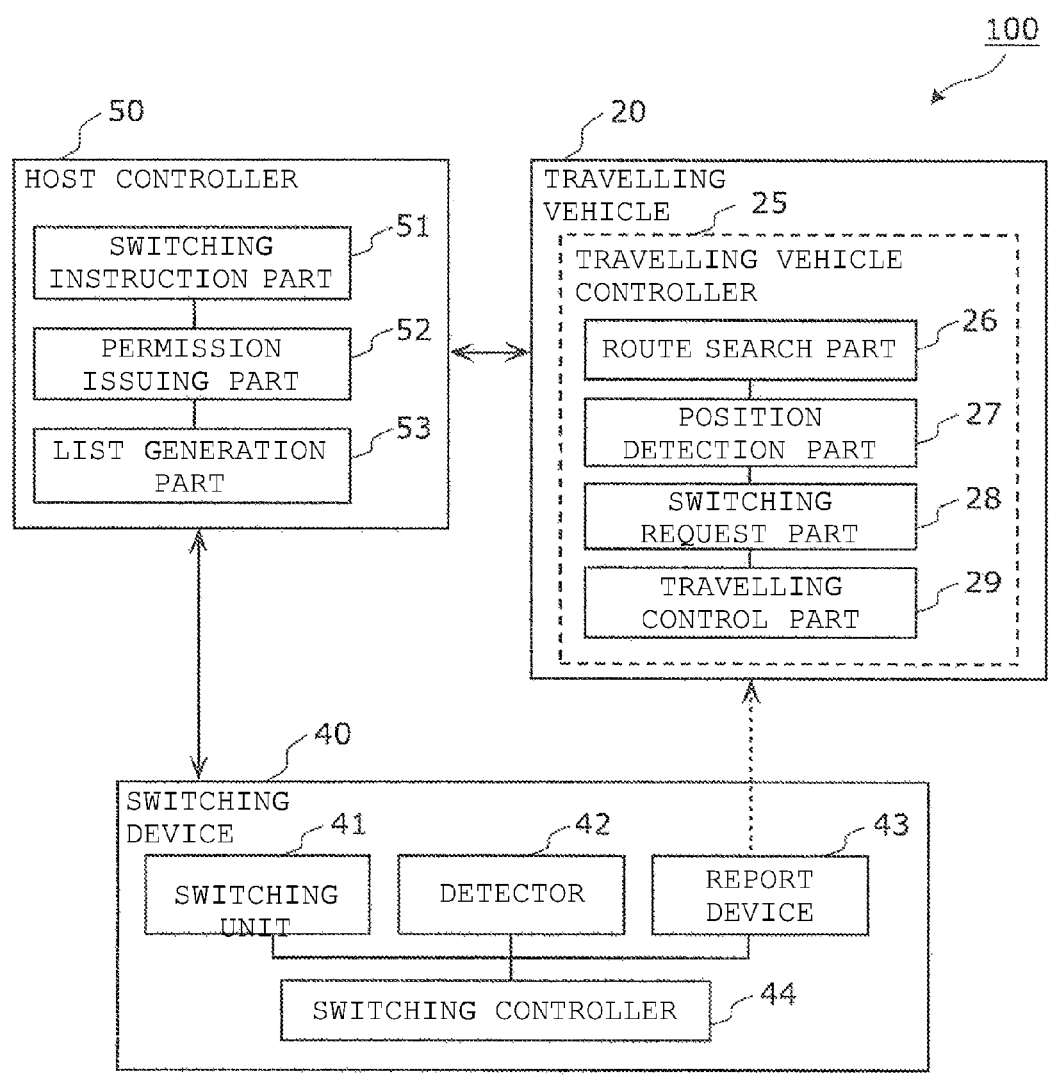
FIG. 3 is a block diagram illustrating a functional configuration of the travelling vehicle system according to the embodiment.

FIG. 1 is a perspective view illustrating a part of a travelling vehicle system according to an embodiment. FIG. 2 is a view illustrating a configuration of the travelling vehicle system according to the embodiment. FIG. 3 is a block diagram illustrating a functional configuration of the travelling vehicle system according to the embodiment.

A travelling vehicle system 100 is a system for automatically carrying a cargo. In the travelling vehicle system 100, a plurality of travelling vehicles travel along a rail 30. At this time, the plurality of travelling vehicles transfer cargos among racks 110A to 110C, to store and carry the cargos.

As illustrated in FIGS. 1 and 2, the travelling vehicle system 100 is provided with the racks 110A to 110C, the plurality of travelling vehicles including a travelling vehicle 20, the rail 30, a switching device 40 and a host controller 50. Although there has been illustrated a case where two travelling vehicles are included in the travelling vehicle system in the present embodiment, the number of travelling vehicles is not restricted to two.

The rack 110A, though not illustrated, is a rack that is used at the time of carrying in and carrying out a cargo. As illustrated in FIG. 1, the racks 110B and 110C are equipment capable of storing cargos along a travelling direction in which the travelling vehicle 20 travels (Y-axis direction in the drawing in the case of the present embodiment). The racks 110A to 110C can further store cargos in a perpendicular direction. In the racks 110A to 110C, placement members for placing and storing cargos are provided in parallel along the travelling direction and the vertical direction (Z-axis direction in the drawing). It is to be noted that the configuration and arrangement of the racks 110A to 110C are not restricted to these.

[1-1. Configuration of Track]

The rail 30 is one example of the track, and provided on a ceiling. The rail 30 forms two circulating routes connected to each other in the present embodiment. In FIG. 2, the travelling vehicle 20 travels on each of the circulating routes clockwise in the drawing.

Further, barcodes indicating information that shows positions on the rail 30 are stuck to the rail 30 at a plurality of places.

[1-2. Configuration of Switching Device]

The switching device 40 switches a state of the track in a switching region. In the present embodiment, the switching region is a position of a divergence or a merge of the rail 30. As illustrated in FIG. 2, the switching device 40 is provided with a switching unit 41, a detector 42, a report device 43, and a switching controller 44.

The switching unit 41 is provided in the switching region and switches the state of the track. In the present embodiment, the switching unit 41 selectively switches the course at the divergence or the merge of the rail 30.

Specifically, for example as illustrated in FIG. 2, the switching unit 41 slides the two movable rails between the right end and the left end to selectively switch the course. Herein, the right end and the left end are defined in the state of being seen from a travelling direction of the travelling vehicle 20. Hence FIG. 2 illustrates a state where two movable rails (for going straight and for turning right) of each of two switching devices 41 are both at the left ends, and the movable rails for turning right have been selected. It is to be noted that definitions of the right end and the left end may be previously set, and are not restricted to these.

The detector 42 detects the state of the track in the switching region. In the present embodiment, the detector 42 detects positions of the two movable rails. Specifically, the detector 42 detects whether or not the two movable rails are at the right end and whether or not the two movable rails are at the left end. For example, in the state of FIG. 2, the detector 42 detects that the two movable rails are at the left end and are not at the right end.

The report device 43 is arranged along the rail 30 from the switching region toward the upstream side of the rail 30. The report device 43 reports switching information showing the state of the track detected by the detector 42. That is, the report device 43 unilaterally transmits the switching information from the switching region to the upstream side of the rail 30. Specifically, for example, the report device 43 successively transmits the switching information by use of an electromagnetic wave.

In the present embodiment, the switching information includes information showing whether or not the two movable rails are at the right end and information showing whether or not the two movable rails are at the left end. That is, the switching information includes information showing the course at the divergence or the merge of the rail 30.

The switching controller 44 controls the switching unit 41 based on an instruction from the host controller 50. In the present embodiment, during automatic operation, the switching controller 44 selectively switches the course at the divergence or the merge of the rail 30 based on an instruction from the host controller 50, and makes a report of switching completion to the host controller 50. Further, during manual operation, the switching controller 44 selectively switches the course at the divergence or the merge of the rail 30 based on an instruction from an operator.

[1-3. Configuration of Host Controller]

The host controller 50 can communicate with the travelling vehicle 20 and the switching device 40, and manages the travelling vehicle 20. As illustrated in FIG. 3, the host controller 50 is provided with a switching instruction part 51, a permission issuing part 52 and a list generation part 53.

The switching instruction part 51 instructs the switching controller 44 to switch the state of the track based on a request from a travelling vehicle controller 25. In the present embodiment, the switching instruction part 51 instructs about switching of the course at the divergence or the merge of the rail 30.

The permission issuing part 52 issues to the travelling vehicle controller 25 a passage permission of the switching region. That is, the permission issuing part 52 gives to the travelling vehicle 20 a permission to enter the divergence or the merge of the rail 30 (namely, the switching unit 41). Specifically, the permission issuing part 52 issues the passage permission when receiving a response to the switching instruction from the switching controller 44.

When the travelling vehicle 20 passes through the switching region, the list generation part 53 generates a list showing an alignment sequence of a plurality of travelling vehicles present on the route where the travelling vehicle 20 travels. Further, the list generation part 53 transmits the generated list to the travelling vehicle 20.

[1-4. Configuration of Travelling Vehicle]

The travelling vehicle 20 is a vehicle that travels on the track and has the travelling vehicle controller 25 for controlling driving of the travelling vehicle 20. Specifically, the travelling vehicle 20 travels along the rail 30 while being in the state of being hung on the rail 30. It is to be noted that each of the plurality of travelling vehicles included in the travelling vehicle system 100 has a similar configuration to that of the travelling vehicle 20.

As illustrated in FIG. 1, the travelling vehicle 20 is equipped with a hanging member 21 and a lift stage 22. The hanging member 21 is a member for connecting the travelling vehicle 20 and the lift stage 22 to hang the lift stage 22 on the travelling vehicle 20. The hanging member 21 has flexibility to such an extent as to be reelable and it is, for example, a metal wire or chain. In the present embodiment, the lift stage 22 is hung by use of four hanging members 21. The lift stage 22 holds a cargo while being in the state of being hung on the travelling vehicle 20 by the hanging members 21. In the present embodiment, the lift stage 22 is provided with a transfer device capable of transferring the cargo between the racks 110A to 110C and the lift stage 22.

Further, the travelling vehicle 20 travels as driving a motor by electric power that is supplied via a power feeder wired along the rail 30. It is to be noted that the travelling vehicle 20 may be configured so as to receive power supply from a mounted battery. The travelling vehicle 20 is further provided with a motor capable of reeling the hanging member 21. The travelling vehicle 20 can lift or lower the lift stage 22 hung by the hanging member 21 by reeling in and out the hanging member 21.

As illustrated in FIG. 3, the travelling vehicle controller 25 is provided with a route search part 26, a position detection part 27, a switching request part 28, and a travelling control part 29.

The route search part 26 receives a cargo loading/unloading instruction from the host controller 50, to decide a travelling route on which the travelling vehicle 20 is allowed to travel.

The position detection part 27 detects the position of the travelling vehicle 20 on the track. In the present embodiment, the position detection part 27 reads the barcode attached to the rail 30. The barcode includes information showing its position. Hence the position detection part 27 can detect the position of the travelling vehicle 20 on the track by analyzing the information shown by the barcode.

The switching request part 28 requests the host controller 50 to switch the course at the divergence or the merge of the rail 30 based on the travelling route decided by the route search part 26.

The travelling control part 29 controls travelling of the travelling vehicle 20. That is, the travelling control part 29 allows the travelling vehicle 20 to travel in accordance with the travelling route decided by the route search part 26. At that time, the travelling control part 29 refers to the list received from the host controller 50, to specify a travelling vehicle travelling ahead of the travelling vehicle 20 (own travelling vehicle). The travelling control part 29 then communicates with the specified travelling vehicle, to control a distance from the forward travelling vehicle.

Further, the travelling control part 29 acquires switching information reported by the report device 43. In the present embodiment, the travelling control part 29 receives an electromagnetic wave transmitted from the report device 43 by use of an antenna, not illustrated, to acquire the switching information. That is, the travelling control part 29 acquires the switching information from the report device 43 in a non-contact manner when the travelling vehicle 20 is travelling upstream of the switching region in which the report device 43 is arranged. Therefore, the travelling control part 29 can acquire the switching information without stopping the travelling vehicle 20.

The travelling control part 29 then determines whether or not the travelling vehicle stops before the switching region based on the passage permission from the host controller 50 and the switching information from the report device 43. In the present embodiment, the travelling control part 29 determines that the travelling vehicle does not stop before the switching region when (i) the passage permission is issued, and (ii) the state of the track conforms to the travelling route of the travelling vehicle 20 at the divergence or the merge of the track. Conversely, the travelling control part 29 determines that the travelling vehicle stops before the switching region when (i) the passage permission is not issued, and (ii) the state of the track does not conform to the travelling route of the travelling vehicle 20 at the divergence or the merge of the track.

Here, when determining that the travelling vehicle stops before the switching region, the travelling control part 29 stops the travelling vehicle 20 before the switching region. On the other hand, when determining that the travelling vehicle does not stop before the switching region, the travelling control part 29 allows the travelling vehicle 20 to pass through the switching region.

[1. Operation of Travelling Vehicle System]

Figure 4:
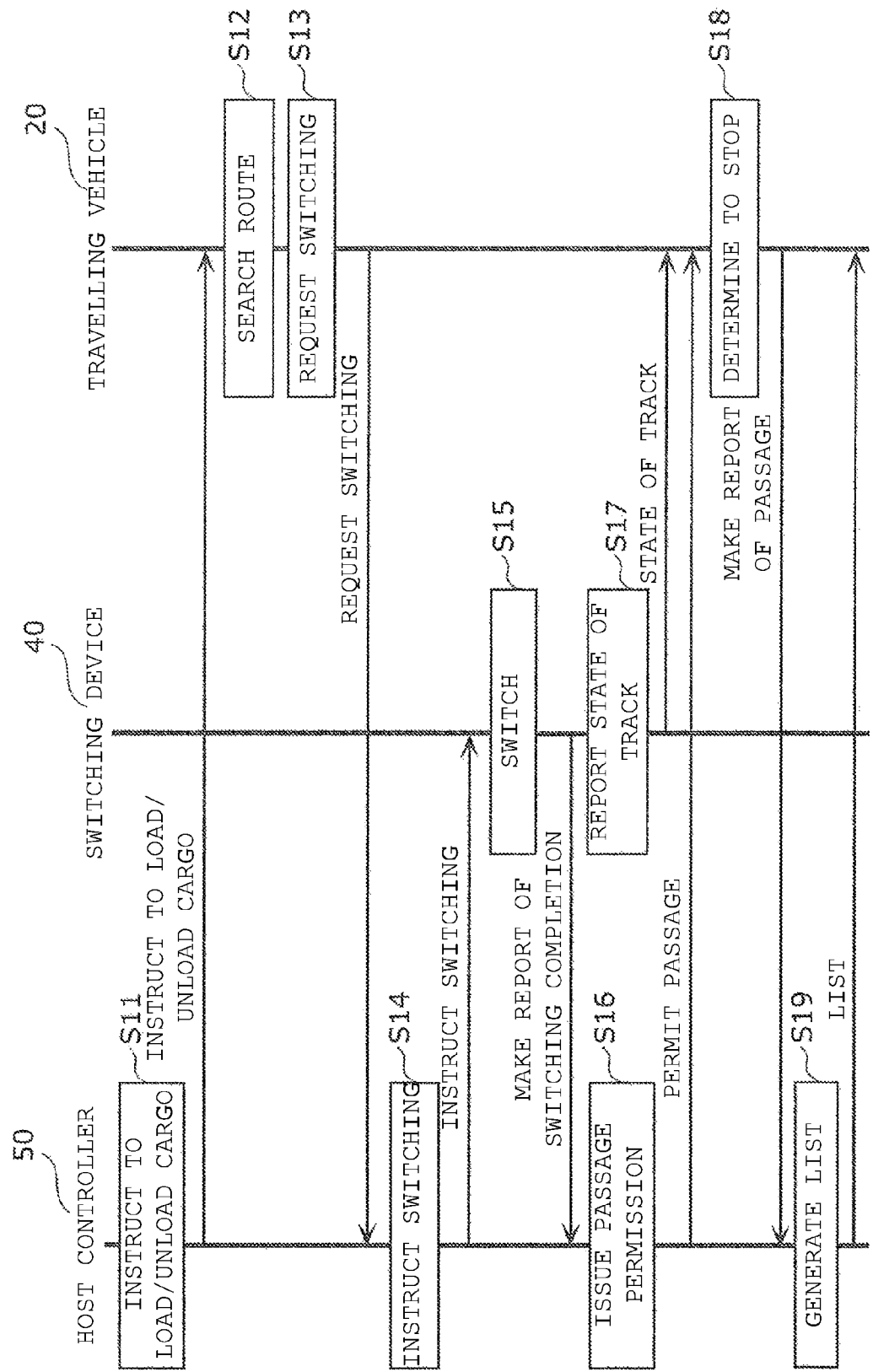
FIG. 4 is a sequence diagram illustrating processing of the travelling vehicle system according to the embodiment.
Figure 5:
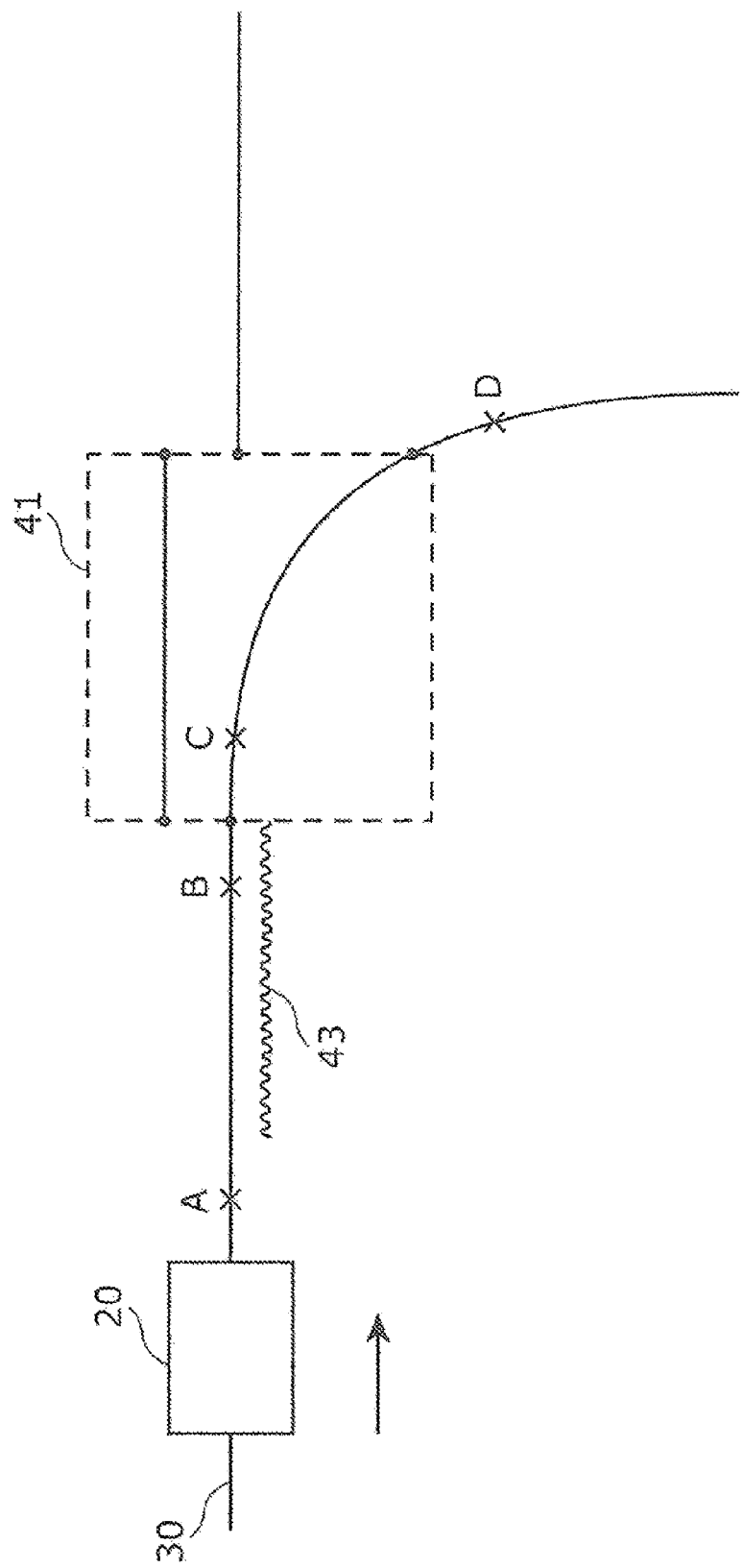
FIG. 5 is a view for explaining an operation of the travelling vehicle system according to the embodiment.

Next, an operation of the travelling vehicle system 100 configured as above will be described. FIG. 4 is a sequence diagram illustrating processing of the travelling vehicle system according to the embodiment. FIG. 5 is a view for explaining the operation of the travelling vehicle system according to the embodiment. It is to be noted that in the following, the travelling vehicle 20 is controlled based on its position on the rail 30 detected by the position detection part 27.

The host controller 50 transmits a cargo loading/unloading instruction to the travelling vehicle 20 (S11) The cargo loading/unloading instruction includes information of a cargo loading position and a cargo unloading position. Herein, a description will be given of the case of instructing the travelling vehicle 20 that the rack 110A illustrated in FIG. 2 is taken as the cargo loading position and the rack 110B illustrated in FIG. 2 is taken as the cargo unloading position. Further, in the present embodiment, a description will be given of a case where, after the travelling vehicle 20 passes through the rack 110A, the host controller 50 transmits the cargo loading/unloading instruction to the travelling vehicle 20.

The route search part 26 of the travelling vehicle 20 decides a travelling route on which the travelling vehicle 20 is allowed to travel based on the cargo loading/unloading instruction (S12). In FIG. 2, the route search part 26 decides one travelling route out of two travelling routes: a first route of going straight at the divergence of the rail 30; and a second route of turning right at the divergence of the rail 30. Herein, the route search part 26 decides the second route being the shortest route to reach the rack 110A.

The travelling vehicle 20 travels along the decided travelling route, to reach a point A upstream of the divergence of the rail 30, illustrated in FIG. 5. At this time, the switching request part 28 of the travelling vehicle 20 requests the host controller 50 to switch the course in the switching unit 41 (S13). Specifically, the switching request part 28 requests to switch the course in the switching unit 41 to turn right. At this time, the travelling control part 29 may decelerate the travelling vehicle 20.

The switching instruction part 51 of the host controller 50 instructs the switching controller 44 to switch the state of the track based on the request from the travelling vehicle controller 25 (S14). Specifically, the switching instruction part 51 instructs the controller 44 to switch the position of the movable rail to the left end so as to switch the course to turn right.

The switching controller 44 of the switching device 40 controls the switching unit 41 based on the instruction from the host controller 50, to switch the state of the track (S15) Specifically, when it has been detected by the detector 42 that the movable rail is not at the left end, the switching controller 44 moves the movable rail to the left end. Conversely, when it has been detected by the detector 42 that the movable rail is at the left end, the switching controller 44 holds the position of the movable rail. The switching controller 44 then makes a report of switching completion to the host controller 50.

Upon receipt of the report of switching completion from the switching device 40, the permission issuing part 52 of the host controller 50 issues to the travelling vehicle 20 a passage permission of the switching region provided with the switching unit 41 (S16).

The report device 43 of the switching device 40 successively reports switching information showing the state of the track detected by the detector 42 (S17). For example, when the switching unit 41 is in the state illustrated in FIG. 5, the report device 43 reports switching information showing that the switching device 40 is in automatic operation and the movable rail is at the left end.

The travelling control part 29 of the travelling vehicle 20 acquires the switching information when travelling in a rail portion along which the report device 43 is arranged. The travelling control part 29 then determines whether or not the travelling vehicle stops before the switching region based on the passage permission from the host controller 50 and the switching information from the report device 43 (S18).

Specifically, when the travelling vehicle 20 is travelling between the point A and a point B, if all passage conditions are satisfied, the travelling control part 29 accelerates the travelling vehicle 20 to allow it to enter a point C without stopping at the point B. Here, the passage conditions are that (i) the passage permission has been issued, (ii) the movable rail is at the left end, and (iii) the switching device 40 is in automatic operation. Conversely, even if just one of the passage conditions is not satisfied, the travelling control part 29 stops the travelling vehicle 20 at the point B.

After the travelling vehicle 20 has passed through the switching region, it makes a report of passage through the switching region to the host controller 50. Herein, when the travelling vehicle 20 reaches a point D, it makes a report of passage through the switching region to the host controller 50. It is to be noted that this report of passage through the switching region may not be made by the travelling vehicle 20, but may be reported by a sensor provided at the point D.

Upon receipt of the report of passage through the switching region from the travelling vehicle 20, the list generation part 53 of the host controller 50 generates a list showing an alignment sequence of a plurality of travelling vehicles on the route where the travelling vehicle 20 travels (S19). The generated list is transmitted to the travelling vehicle 20.

[3. Effect]

As described above, with the travelling vehicle system 100 according to the present embodiment, the switching information showing the state of the track in the switching region is reported by the report device arranged along the track from the switching region toward the upstream side of the track. Hence the travelling vehicle can acquire the switching information while travelling, so as to determine whether or not the travelling vehicle stops before the switching region. That is, the travelling vehicle can pass through the switching region without stopping before the switching region, so as to smoothly pass through the switching region.

Further, with the travelling vehicle system 100 according to the present embodiment, it is possible to determine whether or not the travelling vehicle stops before the switching region based on the passage permission from the host controller and the switching information from the report device. Hence it is possible to suppress erroneous passage through the switching region, so as to reduce an accident of the travelling vehicle in the switching region and improve the safety of the travelling vehicle system.

Further, with the travelling vehicle system 100 according to the present embodiment, when the switching unit is equipment for selectively switching a course at a divergence or a merge of the track, it is possible to appropriately determine whether or not the travelling vehicle stops before the switching region. Specifically, it is possible to determine that the travelling vehicle does not stop before the switching region when the passage permission is issued and the state of the track conforms to the travelling route of the travelling vehicle at the divergence or the merge of the track. Hence the travelling vehicle can smoothly travel along the travelling route at the divergence or the merge of the track without stopping before the switching region.

Further, with the travelling vehicle system 100 according to the present embodiment, even when the switching unit is equipment for sliding the two movable rails between the right end and the left end to selectively switch the course, the travelling vehicle can smoothly pass through the switching region.

Further, with the travelling vehicle system 100 according to the present embodiment, when the travelling vehicle passes through the switching region, the list showing the alignment sequence of a plurality of travelling vehicles can be transmitted to the travelling vehicle. That is, even when the alignment sequence of a plurality of travelling vehicles on the route changes by the travelling vehicle passing through the switching region, a list showing the updated alignment sequence can be transmitted to the travelling vehicle. Hence the travelling vehicle can correctly grasp a forward travelling vehicle, so as to appropriately control a distance from the forward travelling vehicle.

Other Embodiments

Although the travelling vehicle system according to one or a plurality of aspects of the present invention have been described above based on the embodiment, the present invention is not restricted to this embodiment. So long as not deviating from the gist of the present invention, modes obtained by applying a variety of alternatives conceivable by a person skilled in the art to the present embodiment and a mode constructed by combining constituents in different embodiments may also be included in one or a plurality of aspects of the present invention.

For example, although the track is the rail hung from the ceiling in the above embodiment, this is not restrictive. For example, the track may be a rail or a travelling path provided on the ground.

Although the switching unit has selectively switched the course at the divergence or the merge of the track in the above embodiment, this is not restrictive. For example, the switching unit may be an openable shutter for dividing a space in the switching region. That is, the switching unit may be an automatic shutter provided at an entrance door of a closed section such as a clean room or a refrigerated room.

In this case, the detector may detect as the state of the track whether or not the shutter is in an open state. Further, the report device may report, as switching information, information showing whether or not the shutter is in the open state. Then, the travelling vehicle controller may determine that the travelling vehicle does not stop before the switching region when (i) the passage permission is issued, and (ii) the shutter is in the open state.

As thus described, even when the switching unit is the shutter, it is possible to pass through the switching region without stopping before the switching region, so as to smoothly pass through the switching region.

Although the switching information in the above embodiment has included information showing whether or not the two movable rails are at the right end and information showing whether or not the two movable rails are at the left end, this is not restrictive. For example, the switching information may further include information showing whether or not the switching device is in automatic operation. In this case, the travelling vehicle controller may determine that the travelling vehicle does not stop before the switching region when (i) the passage permission is issued, (ii) the state of the track conforms to the travelling route of the travelling vehicle at the divergence or the merge of the track, and (iii) the switching device is in automatic operation. Accordingly, when the switching device is in automatic operation, it is possible to determine that the travelling vehicle does not stop before the switching region. That is, when the switching device is not in automatic operation (e.g., when it is in manual operation), it is possible to prevent the travelling vehicle from entering the switching region, so as to reduce an accident of the travelling vehicle in the switching region and improve the safety of the travelling vehicle system.

Moreover, the switching information may include information showing whether or not an electromagnetic wave for reporting is stable and information showing whether or not reporting is valid. That is, the switching information may be any information so long, as being information showing the state of the track in the switching region.

Although the switching unit has selectively switched the course by sliding the two movable rails between the right end and the left end in the above embodiment, the course switching method is not restricted to this. For example, the switching unit may rotate the movable rail to selectively switch the course.

It is to be noted that one aspect of the present invention may only be such a travelling vehicle system, but may be a travelling vehicle managing method which takes characteristic configuration parts included in the travelling vehicle system as steps. Further, one aspect of the present invention may be a computer program which makes a computer execute each characteristic step included in the travelling vehicle managing method. Moreover, one aspect of the present invention may be a non-temporary recording medium in which such a computer program is recorded and which is readable by the computer.

The present invention can be used as a travelling vehicle system for automatically carrying a cargo.

What is claimed is:

1. A travelling vehicle system comprising:
a track;
a travelling vehicle which travels on the track and has a travelling vehicle controller for controlling driving of the travelling vehicle;
a switching device which switches a state of the track in a switching region; and
a host controller which can communicate with the travelling vehicle and the switching device and manages the travelling vehicle,
wherein
the switching device includes
a switching unit which is provided in the switching region and switches the state of the track,
a detector which detects the state of the track in the switching region,
a report device which is arranged along the track from the switching region toward an upstream side of the track and reports switching information showing the state of the track detected by the detector, and
a switching controller which controls the switching unit based on an instruction from the host controller,
the host controller includes
a switching instruction part which instructs the switching controller to switch the state of the track based on a request from the travelling vehicle controller, and
a permission issuing part which issues to the travelling vehicle controller a passage permission of the switching region, and
the travelling vehicle controller includes a travelling control part which determines whether or not the travelling vehicle stops before the switching region based on the passage permission from the host controller and the switching information from the report device.

2. The travelling vehicle system according to claim 1, wherein
the switching unit selectively switches a course at a divergence or a merge of the track, and
the travelling vehicle controller determines that the travelling vehicle does not stop before the switching region when (i) the passage permission is issued, and (ii) the state of the track conforms to a travelling route of the travelling vehicle at the divergence or the merge of the track.

3. The travelling vehicle system according to claim 2, wherein
the switching unit slides two movable rails between a right end and a left end, to selectively switch the course,
the detector detects, as the state of the track, whether or not the two movable rails are at the right end and whether or not the two movable rails are at the left end, and
the report device reports, as the switching information, information showing whether or not the two movable rails are at the right end and information showing whether or not the two movable rails are at the left end.

4. The travelling vehicle system according to claim 2, wherein
the switching information further includes information showing whether or not the switching device is in automatic operation, and
the travelling vehicle controller determines that the travelling vehicle does not stop before the switching region when (i) the passage permission is issued, (ii) the state of the track conforms to the travelling route of the travelling vehicle at the divergence or the merge of the track, and (iii) the switching device is in automatic operation.

5. The travelling vehicle system according to claim 1, wherein the host controller further includes
a list generation part which, when the travelling vehicle passes through the switching region, generates a list showing an alignment sequence of a plurality of travelling vehicles present on the travelling route where the travelling vehicle travels, and transmits the list to the travelling vehicle.

6. The travelling vehicle system according to claim 1, wherein
the switching unit is an openable shutter for dividing a space in the switching region,
the detector detects, as the state of the track, whether or not the shutter is in an open state,
the report device reports, as the switching information, information showing whether or not the shutter is in the open state, and
the travelling vehicle controller determines that the travelling vehicle does not stop before the switching region when (i) the passage permission is issued, and (ii) the shutter is in the open state.

* * * * *